United States Patent
Yeh et al.

(10) Patent No.: US 11,210,985 B2
(45) Date of Patent: Dec. 28, 2021

(54) SIGNAL PROCESSING METHOD FOR MAINTAINING SIGNAL RELATIVE RELATIONSHIP AND ELECTRONIC DEVICE THEREOF

(71) Applicant: REALTEK SEMICONDUCTOR CORP., Hsinchu (TW)

(72) Inventors: Tzu-Min Yeh, Hsinchu (TW); Po-Hsien Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/816,847

(22) Filed: Mar. 12, 2020

(65) Prior Publication Data
US 2021/0166598 A1 Jun. 3, 2021

(30) Foreign Application Priority Data
Nov. 29, 2019 (TW) .................................. 108143829

(51) Int. Cl.
*G09G 3/20* (2006.01)
*H04N 7/56* (2006.01)

(52) U.S. Cl.
CPC .................. *G09G 3/20* (2013.01); *H04N 7/56* (2013.01); *G09G 2320/0247* (2013.01)

(58) Field of Classification Search
CPC .................. G06F 3/04184; G09G 3/20; G09G 2320/0247; G09G 2320/062; G09G 2320/0646; G09G 3/3406; H04N 7/56
See application file for complete search history.

(56) References Cited

U.S. PATENT DOCUMENTS

| | | | | |
|---|---|---|---|---|
| 2011/0157260 A1* | 6/2011 | Pyun | .................... | G09G 3/3406 345/691 |
| 2013/0342434 A1* | 12/2013 | Chen | ..................... | G09G 3/342 345/102 |
| 2014/0184485 A1* | 7/2014 | Kim | ..................... | G09G 3/3406 345/102 |
| 2019/0164507 A1* | 5/2019 | Wu | ..................... | G09G 3/3406 |

FOREIGN PATENT DOCUMENTS

WO   WO 2012/165172 A1   6/2012

* cited by examiner

*Primary Examiner* — Robert J Michaud
(74) *Attorney, Agent, or Firm* — Birch, Stewart, Kolasch & Birch, LLP

(57) ABSTRACT

A signal processing method for maintaining a signal relative relationship and an electronic device thereof are provided. The signal processing method includes: detecting that a current input period of a vertical synchronization signal changes relative to a previous input period; determining whether a frequency difference between a pulse width modulation signal and the vertical synchronization signal is within an acceptable range, and when the frequency difference is not within the acceptable range, performing a frequency adjustment stage to adjust a period of the pulse width modulation signal to be close to the current input period; selectively performing a phase adjustment stage to adjust a phase of the pulse width modulation signal to a phase of the vertical synchronization signal; and maintaining a relative phase relationship between the pulse width modulation signal and the vertical synchronization signal.

9 Claims, 5 Drawing Sheets

SIGNAL PROCESSING METHOD FOR MAINTAINING SIGNAL RELATIVE RELATIONSHIP AND ELECTRONIC DEVICE THEREOF

CROSS-REFERENCE TO RELATED APPLICATION

This non-provisional application claims priority under 35 U.S.C. § 119(a) to Patent Application No. 108143829 in Taiwan, R.O.C. on Nov. 29, 2019, the entire contents of which are hereby incorporated by reference.

BACKGROUND

Technical Field

The disclosure relates to a signal synchronization technology, and in particular, to a signal processing method for maintaining a signal relative relationship and an electronic device thereof.

Related Art

A pulse width modulation (PWM) signal is a signal that controls a backlight switch. When the PWM signal is at a high level, current sink by a power supply may cause a slight deviation in display of a panel, and this deviation is negligible to human eyes. However, when a boundary of this deviation is shifted with a phase difference of the PWM signal, a water ripple rolling up or down may be perceived by the human eyes.

In addition, in digital television, the PWM signal is transmitted to different panels after being generated by a PWM control circuit, and the different panels have corresponding panel characteristics. These restrictions limit adjustment of the PWM signal. Furthermore, brightness of the digital television is to adjust a ratio of a bright band to a dark band by using the PWM signal, so that the human eyes can feel a brightness change of a screen because of vision persistence. Because a bright band ratio of the PWM signal changes with a period of the PWM signal, a bright band time increases correspondingly when the period becomes longer. If there is a large period change, the human eyes may feel instant brightness of the screen, and this phenomenon is considered as a panel flicker.

Carrying on with the foregoing, an output image of the digital television has corresponding backlight adjustment, and a phase and frequency tracking speed is very important during the adjustment. When the PWM control circuit cannot know a period of a vertical synchronization signal in advance, a transient frequency difference and a phase change may occur, resulting in water ripples or flickers on the panel.

SUMMARY

To this end, the disclosure provides a signal processing method for maintaining a signal relative relationship, including: detecting that a current input period of a vertical synchronization signal changes relative to a previous input period; determining whether a frequency difference between a PWM signal and the vertical synchronization signal is within an acceptable range, and when the frequency difference is not within the acceptable range, performing a frequency adjustment stage to adjust a period of the PWM signal to be close to the current input period; determining whether a phase of the PWM signal needs to be adjusted, and when the phase of the PWM signal needs to be adjusted, performing a phase adjustment stage to adjust the phase of the PWM signal to a phase of the vertical synchronization signal; and maintaining a relative phase relationship between the PWM signal and the vertical synchronization signal.

The disclosure further provides an electronic device for maintaining a signal relative relationship, including a display control circuit, a PWM control circuit, and a processor. The processor is electrically connected to and controls the display control circuit and the PWM control circuit. The display control circuit is electrically connected to a display device to output a vertical synchronization signal. The PWM control circuit is electrically connected to the display control circuit and the display device respectively. The PWM control circuit receives the vertical synchronization signal, when a current input period of the vertical synchronization signal changes relative to a previous input period, the PWM control circuit determines whether a frequency difference between a PWM signal and the vertical synchronization signal is within an acceptable range, and when the frequency difference is not within the acceptable range, the PWM control circuit performs a frequency adjustment stage to adjust a period of the PWM signal to be close to the current input period. The PWM control circuit further determines whether a phase of the PWM signal needs to be adjusted, and when the phase of the PWM signal needs to be adjusted, the PWM control circuit performs a phase adjustment stage to adjust the phase of the PWM signal to a phase of the vertical synchronization signal. The PWM control circuit maintains a relative phase relationship between the PWM signal and the vertical synchronization signal.

According to some embodiments, a change between the current input period and the previous input period is that a difference between the current input period and the previous input period exceeds a preset threshold.

According to some embodiments, at the frequency adjustment stage, the period of the PWM signal is adjusted in stages to be close to the current input period and is adjusted by one step value at each stage.

According to some embodiments, a period change amplitude of the PWM signal is inversely proportional to a time required to adjust the phase of the PWM signal to the phase of the vertical synchronization signal.

According to some embodiments, when the relative phase relationship between the PWM signal and the vertical synchronization signal is being maintained, the relative phase relationship in which the phase of the PWM signal is equal to the phase of the vertical synchronization signal may be maintained, or the relative phase relationship in which the PWM signal is different from the vertical synchronization signal by a target phase difference may be maintained.

In conclusion, without water ripples or flickers on a panel, due to characteristics of different display devices in the disclosure, a frequency adjustment manner and a phase adjustment manner are used to adjust the frequency of the PWM signal to be the same as the frequency of the vertical synchronization signal and maintain the stable phase relationship, thereby effectively maintaining an optimal relative relationship between the PWM signal and the vertical synchronization signal.

DETAILED DESCRIPTION

A signal processing method for maintaining a signal relative relationship provided in the disclosure is applicable to an electronic device connected to a display device, and a PWM control circuit is used to process a PWM signal. In the disclosure, it can be ensured that phases of the PWM signal and a vertical synchronization signal do not change slowly all the time to reduce a risk of water ripples, and it is ensured that a period change amplitude of the PWM signal is not extremely large to avoid a panel flicker.

Figure 1:
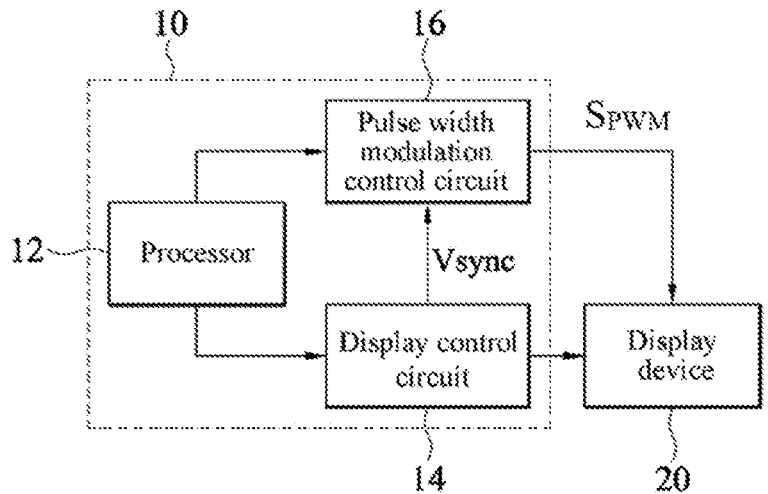
FIG. 1 is a schematic block diagram of an electronic device according to an embodiment of the disclosure.

FIG. 1 is a schematic block diagram of an electronic device according to an embodiment of the disclosure. Referring to FIG. 1, an electronic device 10 includes a processor 12, a display control circuit 14, and a PWM control circuit 16. The processor 12 is electrically connected to the display control circuit 14 and the PWM control circuit 16 to control operations of the display control circuit 14 and the PWM control circuit 16 separately, and the display control circuit 14 and the PWM control circuit 16 are electrically connected to a display device 20 separately. The display control circuit 14 outputs a vertical synchronization signal Vsync to the PWM control circuit 16. In particular, the processor 12 generates a duty cycle signal for controlling brightness to the PWM control circuit 16 to drive the PWM control circuit 16 to generate a PWM signal $S_{PWM}$ to the display device 20, so that the display device 20 controls an enabling/disabling timing of a backlight module of the display device 20 based on the PWM signal $S_{PWM}$. The PWM control circuit 16 also receives the vertical synchronization signal Vsync output by the display control circuit 14. In order to process a frame frequency change of the received vertical synchronization signal Vsync, the PWM control circuit 16 adjusts the PWM signal $S_{PWM}$ accordingly based on a period and a phase of the vertical synchronization signal Vsync output by the display control circuit 14.

In an embodiment, the electronic device 10 is a system-on-a-chip (SoC), and the processor 12, the display control circuit 14, and the PWM control circuit 16 are all built in the SoC.

Figure 2:
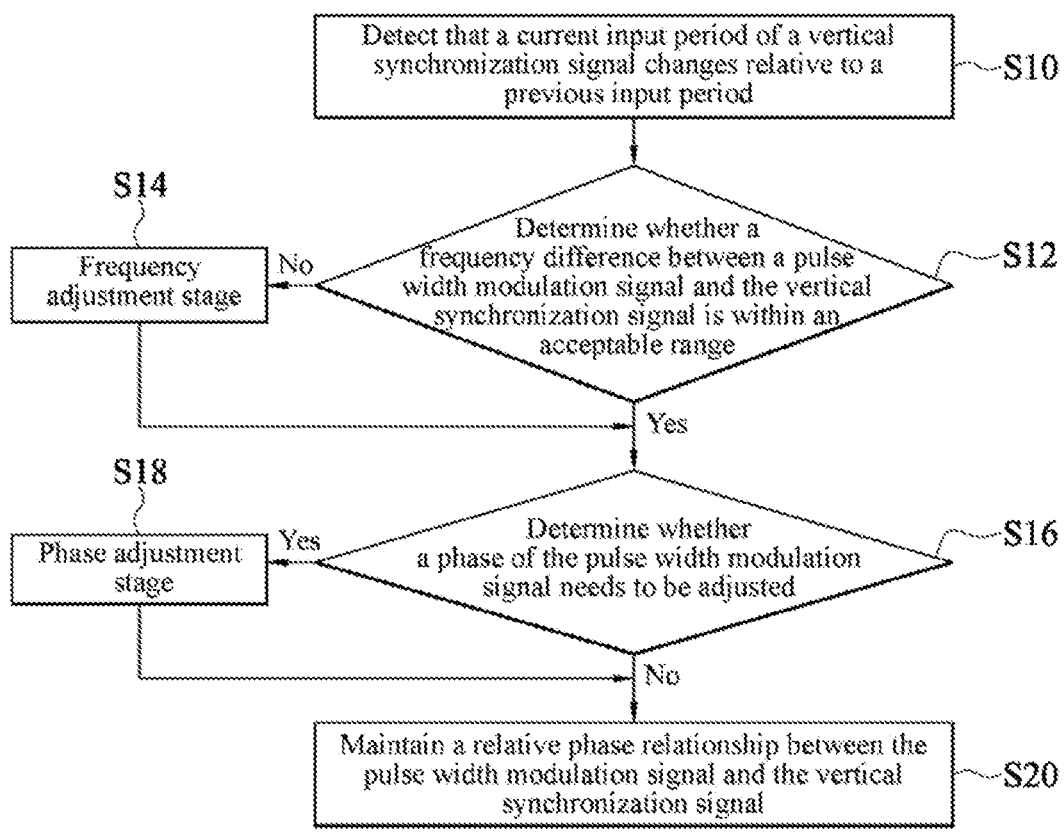
FIG. 2 is a schematic flowchart of a signal processing method according to an embodiment of the disclosure.

FIG. 2 is a schematic flowchart of a signal processing method according to an embodiment of the disclosure. Referring to FIG. 1 and FIG. 2, in this signal processing method, the PWM control circuit 16 continuously determines whether the period of the vertical synchronization signal Vsync from the display control circuit 14 changes. As shown in step S10, when the PWM control circuit 16 detects that a current input period of the vertical synchronization signal Vsync changes relative to a previous input period, an adjustment mechanism may be activated, and step S12 to step S20 are sequentially performed. In an embodiment, the change detected by the PWM control circuit 16 is that a difference between the current input period of the vertical synchronization signal Vsync and the previous input period exceeds a preset threshold.

As shown in step S12, the PWM control circuit 16 determines whether a frequency difference between the PWM signal $S_{PWM}$ and the vertical synchronization signal Vsync is within an acceptable range, and the acceptable range is a frequency range of the vertical synchronization signal Vsync. When the frequency difference is within the acceptable range, it indicates that a frequency of the PWM signal $S_{PWM}$ is close to or the same as a frequency of the vertical synchronization signal Vsync. Therefore, no frequency adjustment needs to be performed, and a next step (step S16) is directly performed. When the PWM control circuit 16 determines that the frequency difference value is not within the acceptable range, as shown in step S14, the PWM control circuit 16 performs a frequency adjustment stage on the PWM signal $S_{PWM}$ to adjust a period of the PWM signal $S_{PWM}$ to be close to the current input period of the vertical synchronization signal Vsync. At the frequency adjustment stage in step S14, the PWM control circuit 16 gradually adjusts the period of the PWM signal $S_{PWM}$ to be close to the current input period, and adjusts the period of the PWM signal $S_{PWM}$ by one step value at each stage. For example, the step value may be 1 millisecond (ms). If the period of the PWM signal $S_{PWM}$ needs to be increased, the period of the PWM signal $S_{PWM}$ is increased by 1 ms each time until the period of the PWM signal $S_{PWM}$ is close to the current input period.

As shown in step S16, the PWM control circuit 16 determines whether a phase of the PWM signal $S_{PWM}$ needs to be adjusted. When the phase of the PWM signal $S_{PWM}$ does not need to be adjusted, a current phase may be considered as a new target phase, and a next step (step S20) is directly performed. When the phase of the PWM signal $S_{PWM}$ needs to be adjusted, as shown in step S18, a phase adjustment stage is performed, so that the PWM control circuit 16 adjusts the phase of the PWM signal $S_{PWM}$ to a phase of the vertical synchronization signal Vsync.

Finally, as shown in step S20, regardless of whether the phase of the PWM signal $S_{PWM}$ is adjusted, the PWM control circuit 16 maintains a relative phase relationship between the PWM signal $S_{PWM}$ and the vertical synchronization signal Vsync. In other words, regardless of whether the target phase is adjusted, for small fluctuation of the vertical synchronization signal Vsync, the PWM control circuit 16 slightly changes the frequency of the PWM signal $S_{PWM}$ to maintain the relative phase relationship between the PWM signal $S_{PWM}$ and the vertical synchronization signal Vsync. In one embodiment, there are two forms of maintaining the relative phase relationship between the PWM signal $S_{PWM}$ and the vertical synchronization signal Vsync. In one form, the PWM control circuit 16 maintains the relative phase relationship in which the phase of the PWM signal $S_{PWM}$ is equal to the phase of the vertical synchronization signal Vsync. In the other form, the PWM control circuit 16 maintains the relative phase relationship in which the phase of the PWM signal $S_{PWM}$ is different from the phase of the vertical synchronization signal Vsync by a target phase difference.

Figure 3A:
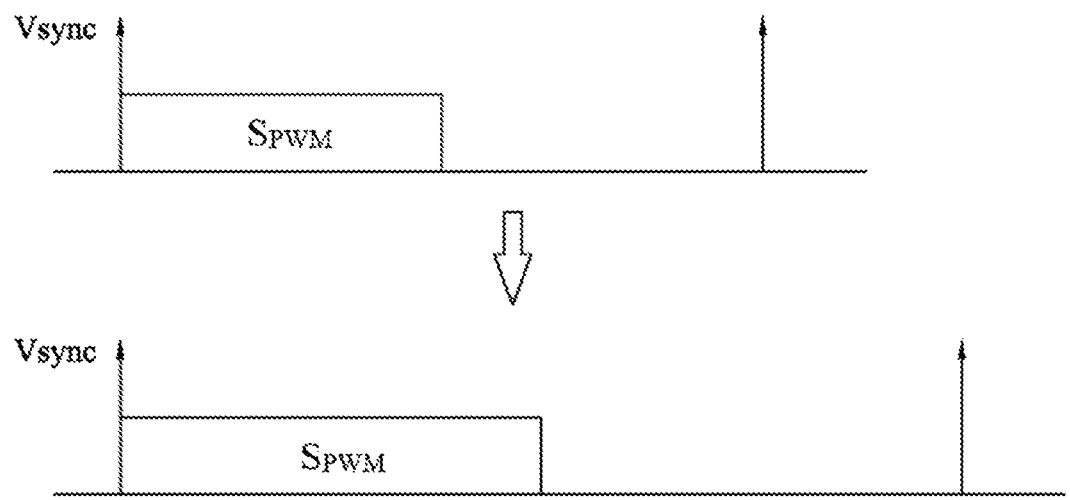
FIG. 3a is a schematic diagram of a relationship between a vertical synchronization signal and a PWM signal before and after a frequency change according to an embodiment of the disclosure.
Figure 3B:
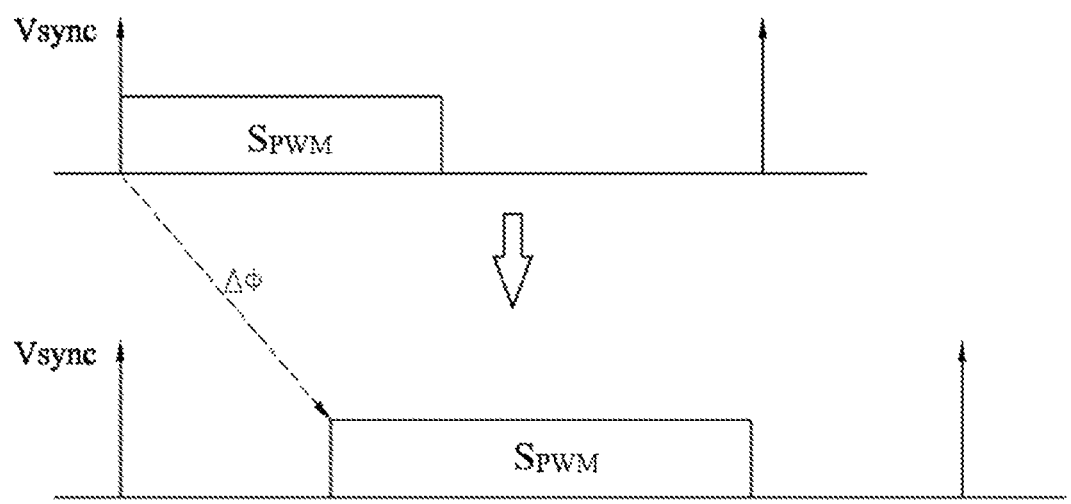
FIG. 3b is a schematic diagram of a relationship between a vertical synchronization signal and a PWM signal before and after a frequency change according to another embodiment of the disclosure.

Because different display devices 20 have different panel characteristics and compatibility, the determining, by the PWM control circuit 16, whether to adjust the phase of the PWM signal $S_{PWM}$ is affected by this factor. As shown in FIG. 1 and FIG. 3a, because the PWM signal $S_{PWM}$ and the vertical synchronization signal Vsync need to be aligned, when a frame frequency changes, the PWM control circuit 16 needs to adjust the phase of the PWM signal $S_{PWM}$ to the phase of the vertical synchronization signal Vsync, so that the PWM signal $S_{PWM}$ is aligned with the vertical synchronization signal Vsync, and starting locations are the same. If the display device 20 can accept, based on a panel characteristic and compatibility, that the PWM signal $S_{PWM}$ and the vertical synchronization signal Vsync are not necessarily aligned, as shown in FIG. 1 and FIG. 3b, when a frame frequency changes, there is a phase difference $\Delta\varphi$ between two adjacent pulses of the PWM signal $S_{PWM}$. In this case, the PWM control circuit 16 directly considers the current pulse phase as the new target phase, and the phase of the PWM signal $S_{PWM}$ does not need to be adjusted.

Figure 4:
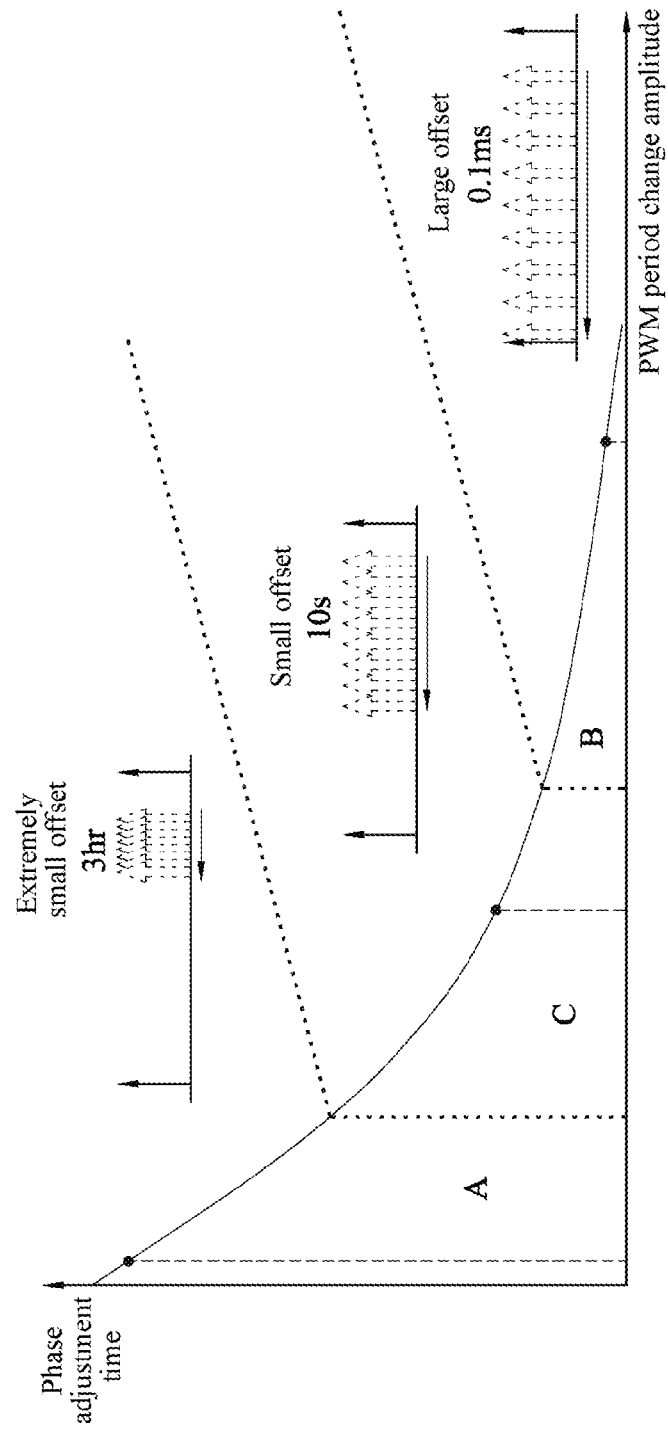
FIG. 4 is a curve diagram of a relationship between a period change amplitude of a PWM signal and a time for adjusting a phase according to an embodiment of the disclosure.

In an embodiment, a period change amplitude of the PWM signal $S_{PWM}$ is inversely proportional to a time required to adjust the phase of the PWM signal $S_{PWM}$ to the phase of the vertical synchronization signal Vsync. FIG. 4 is a curve diagram of a relationship between a period change amplitude of a PWM signal and a time for adjusting a phase according to an embodiment of the disclosure. Referring to FIG. 4, the curve in the figure shows a phase difference after frequency adjustment, and an acceptable period change amplitude of a PWM signal $S_{PWM}$ is inversely proportional to a time for adjusting a phase of the PWM signal $S_{PWM}$. In a range of a left region A, selection of the period change amplitude of the PWM signal $S_{PWM}$ is very small, that is, a period of the PWM signal $S_{PWM}$ is very close to a period of a vertical synchronization signal Vsync. In this case, a phase change is extremely slow, and a water ripple over time is not easily observed. In a range of a right region B, the PWM signal $S_{PWM}$ may have a relatively large period change amplitude, a phase amplitude that can be adjusted at one time is relatively large. In this case, the phase change of the PWM signal $S_{PWM}$ and the vertical synchronization signal Vsync is very fast, and a water ripple is not easily observed either. However, in a range of a middle region C, the phase change is slow but is not extremely slow, and a water ripple can be observed in the middle region C. Therefore, as long as a phase of the PWM signal $S_{PWM}$ is compensated at an extremely fast speed or an extremely slow speed without causing a panel flicker, a risk of the water ripple can be minimized.

In view of above, because different display devices have different panel characteristics, each display device has a curve diagram of a relationship between a period change amplitude of a PWM signal and a phase adjustment time. A most suitable adjustment method and parameter are selected for each display device to stabilize a relative relationship between the PWM signal and the vertical synchronization signal without a panel flicker and a water ripple.

Figure 5:
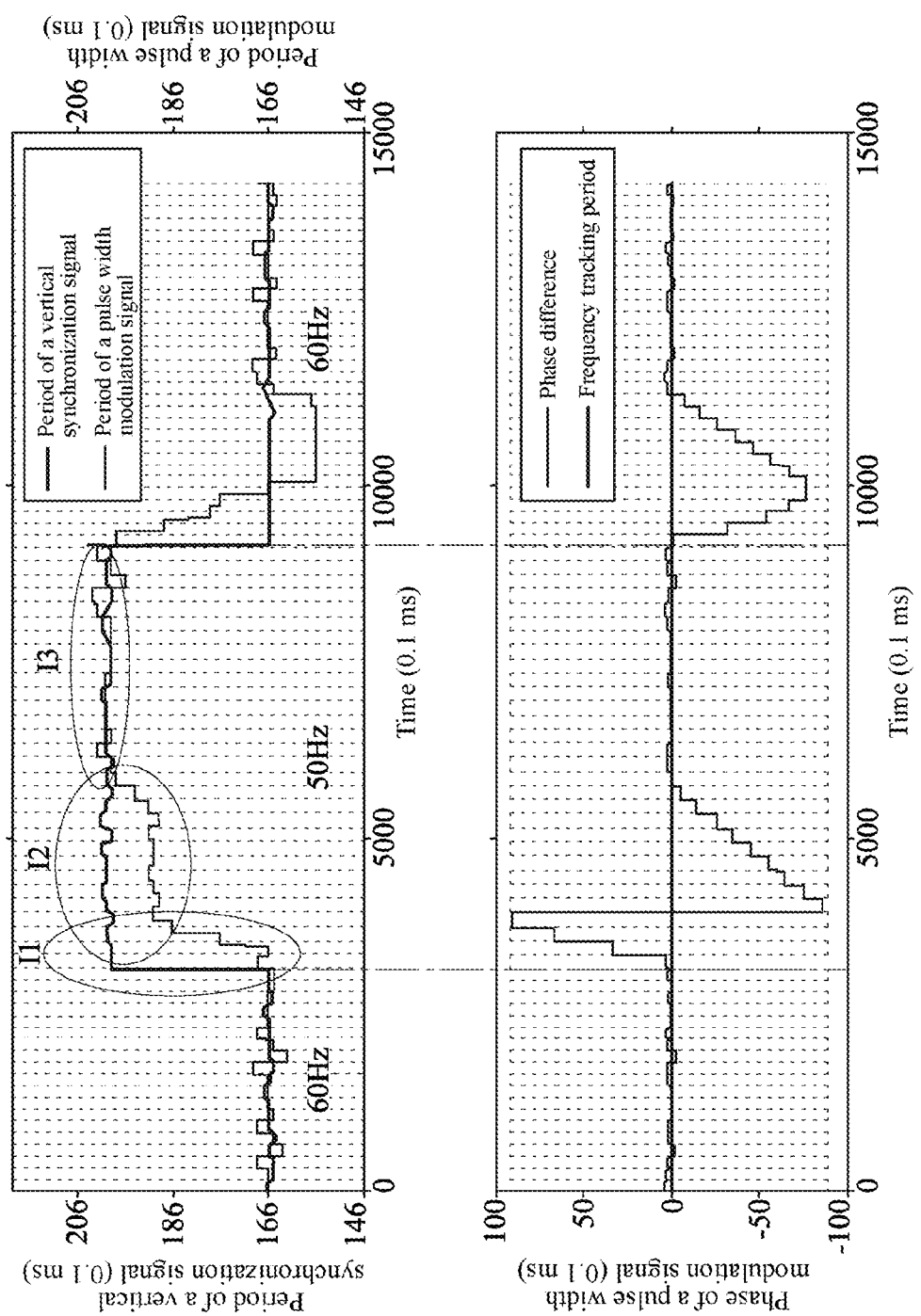
FIG. 5 is a period change relationship diagram and a corresponding phase shift diagram of a vertical synchronization signal and a PWM signal according to an embodiment of the disclosure.

FIG. 5 is a period change relationship diagram and a corresponding phase shift diagram of a vertical synchronization signal and a PWM signal according to an embodiment of the disclosure. In this example, as shown in FIG. 3a, a starting point of the vertical synchronization signal Vsync needs to be aligned with a starting point of the PWM signal $S_{PWM}$, and the PWM signal $S_{PWM}$ has a limited period change amplitude. Referring to FIG. 1 and FIG. 5, when a frame frequency of the vertical synchronization signal Vsync changes from 60 Hz to 50 Hz, the PWM control circuit 16 detects that a current input period of the vertical synchronization signal Vsync changes relative to a previous input period. Because it is not meaningful to perform phase adjustment when a frequency difference is too large, frequency adjustment is performed first. As shown in a range I1, the PWM control circuit 16 starts to adjust a frequency of the PWM signal $S_{PWM}$, so that a period of the PWM signal $S_{PWM}$ is close to the current input period of the vertical synchronization signal Vsync. It can be learned from the corresponding phase shift diagram that a phase of the PWM signal $S_{PWM}$ has a large phase change in this case. After adjusting the frequency, the PWM control circuit 16 analyzes a current phase difference between the PWM signal $S_{PWM}$ and the vertical synchronization signal Vsync, to determine, based on a magnitude of the phase difference, a direction in which the phase of the PWM signal $S_{PWM}$ is adjusted. As shown in a range 12, after the frequency of the PWM signal $S_{PWM}$ is close to a frequency of the vertical synchronization signal Vsync, the PWM control circuit 16 starts to adjust the phase of the PWM signal $S_{PWM}$. It can be learned from the corresponding phase shift diagram that the phase of the PWM signal $S_{PWM}$ increases slowly in this case. After the phase is adjusted, the PWM signal $S_{PWM}$ maintains a fixed relative phase relationship as the vertical synchronization signal Vsync fluctuates slightly. As shown in a range I3, if the vertical synchronization signal Vsync still fluctuates slightly, in order to maintain the relative phase relationship, the PWM control circuit 16 slightly adjust the period of the PWM signal $S_{PWM}$ correspondingly. It can be learned from the corresponding phase shift diagram that the phase of the PWM signal $S_{PWM}$ is basically maintained at 0 in this case.

Figure 6:
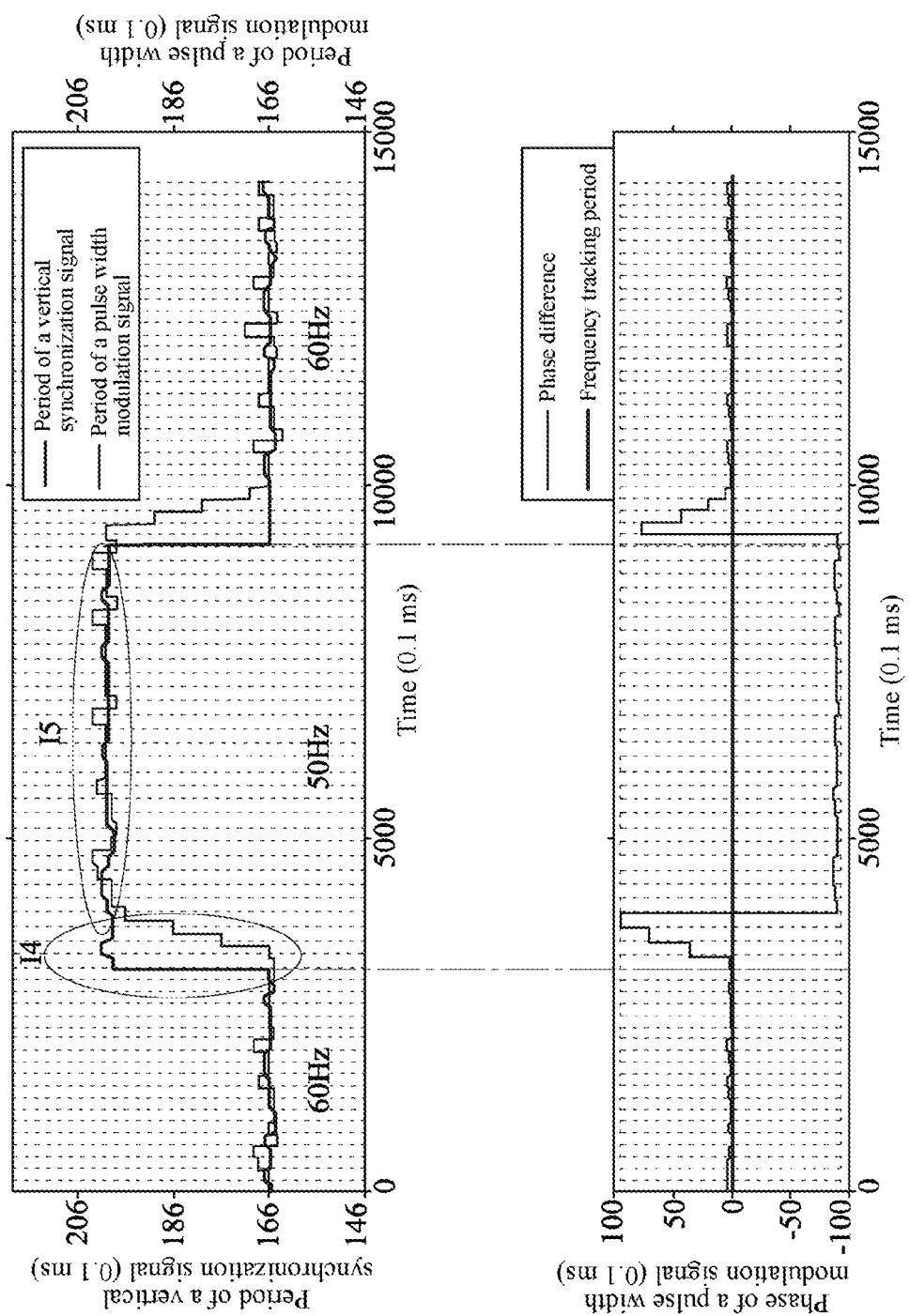
FIG. 6 is a period change relationship diagram and a corresponding phase shift diagram of a vertical synchronization signal and a PWM signal according to another embodiment of the disclosure.

FIG. 6 is a period change relationship diagram and a corresponding phase shift diagram of a vertical synchronization signal and a PWM signal according to another embodiment of the disclosure. In this example, as shown in FIG. 3b, a starting point of the vertical synchronization signal Vsync does not need to be aligned with a starting point of the PWM signal $S_{PWM}$. Referring to FIG. 1 and FIG. 6, when a frame frequency of the vertical synchronization signal Vsync changes from 60 Hz to 50 Hz, the PWM control circuit 16 detects that a current input period of the vertical synchronization signal Vsync changes relative to a previous input period. When a period of the PWM signal $S_{PWM}$ is not close to the vertical synchronization signal Vsync, a frequency difference is adjusted at a fastest speed. As shown in a range 14, the PWM control circuit 16 starts to adjust a frequency of the PWM signal $S_{PWM}$, so that a period of the PWM signal $S_{PWM}$ is close to the current input period of the vertical synchronization signal Vsync. It can be learned from the corresponding phase shift diagram that a phase of the PWM signal $S_{PWM}$ has a large phase change in this case. After adjusting the frequency, the PWM control circuit 16 fixes a current phase of the PWM signal $S_{PWM}$ as a latest target phase, and the target phase is used as a final location during each subsequent phase adjustment. As shown in a range I5, after the frequency of the PWM signal $S_{PWM}$ is close to a frequency of the vertical synchronization signal Vsync, if the vertical synchronization signal Vsync still fluctuates slightly, in order to maintain a relative phase relationship, the PWM control circuit 16 slightly adjust the period of the PWM signal $S_{PWM}$ correspondingly. It can be learned from the corresponding phase shift diagram that the phase of the PWM signal $S_{PWM}$ is basically maintained at a fixed value (the target phase) in this case.

Therefore, after the frequency is adjusted, the current phase difference can be fixed as the target phase difference, and then only a small amplitude change of the vertical synchronization signal Vsync needs to be compensated, so that the target phase difference can be maintained to a specific magnitude, thereby maintaining the relative phase relationship between the PWM signal $S_{PWM}$ and the vertical synchronization signal Vsync.

Therefore, on the premise that there is no water ripple or panel flicker, in the disclosure, characteristics of different display devices are utilized and a frequency adjustment manner and a phase adjustment manner are used to adjust the frequency of the PWM signal to be the same as the frequency of the vertical synchronization signal and maintain a stable phase relationship, thereby effectively maintaining an optimal relative relationship between the PWM signal and the vertical synchronization signal.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A signal processing method for maintaining a signal relative relationship, comprising:
    detecting that a current input period of a vertical synchronization signal changes relative to a previous input period;
    determining whether a frequency difference between a pulse width modulation (PWM) signal and the vertical synchronization signal is within an acceptable range, and when the frequency difference is not within the acceptable range, performing a frequency adjustment stage to adjust a period of the PWM signal to be close to the current input period;
    determining whether a phase of the PWM signal needs to be adjusted, and when the phase of the PWM signal needs to be adjusted, performing a phase adjustment stage to adjust the phase of the PWM signal to a phase of the vertical synchronization signal; and
    maintaining a relative phase relationship between the PWM signal and the vertical synchronization signal;
    wherein a period change amplitude of the PWM signal is inversely proportional to a time required to adjust the phase of the PWM signal to the phase of the vertical synchronization signal.

2. The signal processing method according to claim 1, wherein a change between the current input period and the previous input period is that a difference between the current input period and the previous input period exceeds a preset threshold.

3. The signal processing method according to claim 1, wherein at the frequency adjustment stage, the period of the PWM signal is adjusted in stages to be close to the current input period and is adjusted by one step value at each stage.

4. The signal processing method according to claim 1, wherein the step of maintaining a relative phase relationship between the PWM signal and the vertical synchronization signal is: maintaining the relative phase relationship in which the phase of the PWM signal is equal to the phase of the vertical synchronization signal, or maintaining the relative phase relationship in which the PWM signal is different from the vertical synchronization signal by a target phase difference.

5. An electronic device for maintaining a signal relative relationship, comprising:
    a display control circuit electrically connected to a display device, wherein the display control circuit outputs a vertical synchronization signal;
    a pulse width modulation (PWM) control circuit electrically connected to the display control circuit and the display device respectively, wherein the PWM control circuit receives the vertical synchronization signal, when a current input period of the vertical synchronization signal changes relative to a previous input period, the PWM control circuit determines whether a frequency difference between a PWM signal and the vertical synchronization signal is within an acceptable range, and when the frequency difference is not within the acceptable range, the PWM control circuit performs a frequency adjustment stage to adjust a period of the PWM signal to be close to the current input period; the PWM control circuit further determines whether a phase of the PWM signal needs to be adjusted, and when the phase of the PWM signal needs to be adjusted, the PWM control circuit performs a phase adjustment stage to adjust the phase of the PWM signal to a phase of the vertical synchronization signal; and the PWM control circuit maintains a relative phase relationship between the PWM signal and the vertical synchronization signal; and
    a processor electrically connected to the display control circuit and the PWM control circuit to control the display control circuit and the PWM control circuit;
    wherein a period change amplitude of the PWM signal is inversely proportional to a time required to adjust the phase of the PWM signal to the phase of the vertical synchronization signal.

6. The electronic device according to claim 5, wherein a change between the current input period and the previous input period is that a difference between the current input period and the previous input period exceeds a preset threshold.

7. The electronic device according to claim 5, wherein at the frequency adjustment stage, the period of the PWM signal is adjusted in stages to be close to the current input period and is adjusted by one step value at each stage.

8. The electronic device according to claim 5, wherein the PWM control circuit maintains the relative phase relationship in which the phase of the PWM signal is equal to the phase of the vertical synchronization signal, or the PWM control circuit maintains the relative phase relationship in which the PWM signal is different from the vertical synchronization signal by a target phase difference.

9. The electronic device according to claim 5, wherein the electronic device is a system-on-a-chip (SoC).

* * * * *